United States Patent [19]

Plows

[11] 4,242,671
[45] Dec. 30, 1980

[54] TRANSPONDERS

[76] Inventor: Graham S. Plows, Science Park, Milton Rd., Cambridge, CB4, 4BN, England

[21] Appl. No.: 967,569

[22] Filed: Dec. 8, 1978

[30] Foreign Application Priority Data

Dec. 9, 1977 [GB] United Kingdom ............... 51445/77

[51] Int. Cl.³ ............................................. G08B 13/24
[52] U.S. Cl. .............................. 340/572; 310/313 R; 333/150; 393/6.8 R
[58] Field of Search ............... 340/572; 333/195, 154, 333/150; 310/313; 325/8; 455/19; 343/6.8 R

[56] References Cited

U.S. PATENT DOCUMENTS

| | | | |
|---|---|---|---|
| 2,607,004 | 8/1952 | Harris | 325/8 |
| 3,117,277 | 1/1964 | De Magondeaux | 325/8 |
| 3,706,094 | 12/1972 | Cole et al. | 343/6.8 R |
| 3,711,848 | 1/1973 | Martens | 325/8 |
| 3,725,827 | 4/1973 | Slobodnik, Jr. | 333/150 |
| 4,063,229 | 12/1977 | Welsh | 325/8 |
| 4,081,769 | 3/1978 | Shreve | 333/195 |

Primary Examiner—Glen R. Swann, III
Attorney, Agent, or Firm—Roylance, Abrams, Berdo & Farley

[57] ABSTRACT

A tag transponder which is capable of receiving a signal from a transmitter and re-transmitting the signal after a delay. The incident electromagnetic wave from the transmitter is converted into an acoustic wave in a piezoelectric member of the tag, the acoustic wave traversing the piezoelectric member before re-transmission as an electromagnetic wave; the lower velocity of the acoustic wave compared with the electromagnetic wave provides the delay between the signal received and transmitted by the tag. During the signal pulse from the transmitter the tag continuously re-transmits the signal, and the re-transmitted signal from the tag is sustained after cessation of the signal from the transmitter for a sufficient duration to be distinguished from other transient reflected signals.

3 Claims, 3 Drawing Figures

TRANSPONDERS

This invention relates to transponders, and particularly to a transponder which is adapted to receive and subsequently transmit electromagnetic wave energy and is in the form of a tag or other planar element which may be flexible.

The device, hereinafter called for convenience "tag" is particularly although not exclusively intended for use in a system for inhibiting theft. Such a system may comprise a transmitter, which may be disposed at or near the doorway of a shop, and a receiver disposed likewise. The transmitter may radiate at appropriate intervals an electromagnetic signal constituted by a short pulse of high frequency energy, for example at a frequency between 400 and 700 MHz. The radiation pattern of the transmitter or receiver may be appropriately confined so that if a tag, which would normally be applied to goods for sale but removed at the point of sale, passes into a particular region, a signal radiated by the transmitter will be received by the tag and re-transmitted to the receiver in order to provide an alarm.

For efficacy of the system, the signal re-transmitted by the tag must be distinguishable from the original signal. It is the object of the present invention to provide a tag which can receive and transmit electromagnetic wave energy and provide, between reception and transmission a significant delay so that at a receiver a signal re-transmitted from the tag may be distinguished from any signal emanating from an original transmitter.

According to the invention, a tag which is capable of reception and re-transmission of electromagnetic wave energy and is adapted to convert received wave energy into acoustic wave energy and to re-convert this wave energy into electromagnetic wave energy, includes piezoelectric material which can sustain the acoustic wave energy in the form of a surface acoustic wave for a significant time subsequent to the reception of the electromagnetic wave energy.

There follows a description of the construction and manner of operation of preferred embodiments of the invention.

In preferred embodiments of the invention a tag includes piezoelectric material which is subjected by an appropriate transducer to an oscillatory electrical signal, which induces in the material a mechanical oscillation, namely an acoustic wave which travels along the surface of the piezoelectric member, which may be a crystal or an amorphous or polycrystalline layer on a substrate, to another transducer and is re-converted to an electrical signal.

The re-transmitted signal is similar to, although smaller than, the original signal, and endures at a detectable intensity after cessation of the original transmitted signal and attenuation of its random reflections.

A longer delay between reception and re-transmission may be achieved by the piezoelectric member comprising a resonator, preferably a surface-acoustic-wave resonator (SAW), the high quality factor of acoustic wave resonators providing longer duration of the re-transmitted signal after the transmission of the original signal has ceased. The narrow bandwidth to which such a resonator responds efficiently enables the bandwidth of the transmitter and receiver to be limited. Fabrication of SAW resonators lends itself to large scale production of small devices, e.g. up to a few millimeters square, with a relatively uniform centre frequency e.g. ±0.5 MHz in several hundred MHz.

A preferred embodiment of the invention is now described, by way of example, with reference to the accompanying drawings in which.

Figure 1:
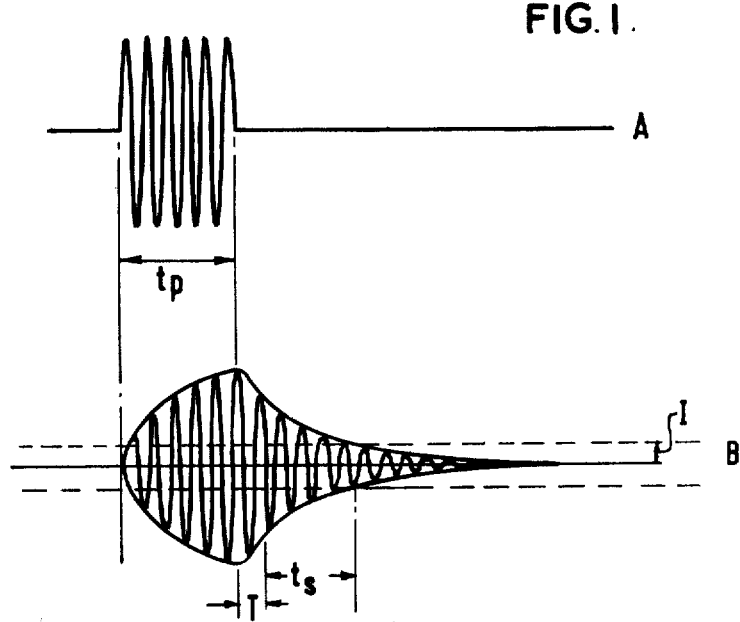
FIG. 1 illustrates schematically the transmitted and corresponding re-transmitted signal.
Figure 2:
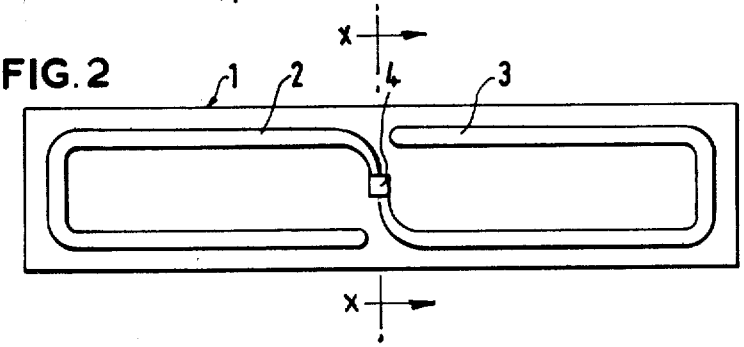
FIG. 2 illustrates a plan view of a flexible tag according to the invention.

Referring to FIG. 1, diagram A illustrates a signal pulse from a transmitter of duration tp, diagram B shows the re-transmitted signal from a tag such as illustrated in FIG. 2. After time tp, when the transmitter signal ceases, the amplitude of the re-transmitted signal progressively decreases; during time T random reflections of the transmitted signal may be present, and so the tag signal is not sampled until the end of the interval T by which time the transient reflections have been attenuated below the detection threshold. Sampling of the re-transmitted signal takes place during time $t_s$, which is the interval in which the re-transmitted signal along is sustained above the threshold detection amplitude I. The total decay time $(T+t_s)$ for a tag incorporating a quartz SAW resonator may be of the order of several microseconds; this compares favourably with a printed inductance-capacitance resonant circuit in which the decay time may be of the order of 100 nanoseconds and the time periods T and $t_s$ not separable.

The tag shown in FIG. 2 comprises a flexible substrate I made, for example, of a polyester film such as 'MYLAR', on which two metal antennae 2 and 3 are disposed, e.g. by screen printing, or by selective etching of a metallic (preferably copper) layer on the film, and which are connected to a surface acoustic wave resonator 4 at the centre of the tag. It is possible to use one or more antennae, the purpose of these being to assist efficient reception and re-transmission of the signal. Typically the long dimension of the antennae is equal to or less than λ4 of the transmitted frequency.

A quartz crystal may be used for the resonator, or alternatively a thin layer of piezoelectric material such as zinc oxide disposed on a substrate. Such a thin layer may be deposited by sputtering, either directly on to the flexible substrate 1, or on to a rigid substrate such as glass which is embedded in or attached to the centre of the flexible substrate 1. The layer thickness may be 2 to 3 μm, although a thicker layer of 20 to 30 μm may be used.

Figure 3:
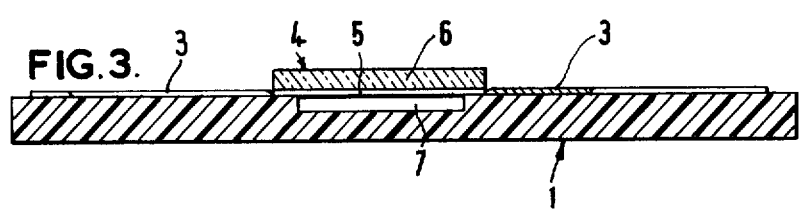
FIG. 3 illustrates a cross-section along the line x—x of the tag shown in FIG. 2.

FIG. 3 shows a sectional view of the tag illustrated in FIG. 2, in which the SAW resonator 4 consists of a zinc oxide layer 5 deposited on a glass substrate 6. The antennae are conductively bonded to the transducer layer 5 by, for example, ultrasonic or thermal compression bonding. A recess 7 in the substrate allows the surface of the device to remain free to promote efficient surface wave propagation, and the entire tag may be encapsulated by a flexible coating.

In a system where several tags are used, such as in a pilfering protection system, it is necessary for a range of frequencies to be transmitted; this may be achieved by sweeping the transmitter through the frequency range in which the resonant frequencies of all the tags will lie. An exemplary specification for such a system is as follows:

Transmitter power: 100 MW
Transmitter frequency: 400 MHz

Transmitter's amplitude modulation: by a 15 KHz square wave (requiring a band width of ±½ MHz)

Transmitter's frequency modulation: 10 KHz per millisecond

Transmitter interrogater tags over a frequency range determined by the centre frequency spread occurring in bulk manufacture of the tags, for example ±0.5 MHz Tag's Q (quality factor): 10,000 at 400 MHz The FM bandwidth nominally ±0.5 MHz, giving a total bandwidth of ±1 MHz and a total search time of 75 milliseconds.

I claim:

1. A passive transponder tag comprising
   a flexible substrate;
   at least one antenna disposed on said substrate for the reception and retransmission of electromagnetic wave energy;
   a member including a body of piezoelectric material disposed on said substrate and connected to said antenna and adapted to convert received electromagnetic energy into an acoustic surface wave and to convert the acoustic wave into electromagnetic energy for retransmission by said antenna; and
   means defining a recess between said member and said substrate for permitting a surface of the piezoelectric material to remain free for the propagation and sustaining of the acoustic surface wave.

2. A tag according to claim 1 in which two loop antennae are disposed on the substrate and are interconnected by said body of piezoelectric material.

3. A tag according to claim 1 or claim 2 in which said body of piezoelectric material comprises a thin film of zinc oxide.

* * * * *